(12) United States Patent  
Hemmi et al.

(10) Patent No.: US 9,377,051 B2  
(45) Date of Patent: Jun. 28, 2016

(54) DUPLEX BEARING DEVICE

(71) Applicant: Hitachi, Ltd., Chiyoda-ku, Tokyo (JP)

(72) Inventors: Makoto Hemmi, Tokyo (JP); Kenta Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/655,467

(22) PCT Filed: Dec. 28, 2012

(86) PCT No.: PCT/JP2012/084029  
§ 371 (c)(1),  
(2) Date: Jun. 25, 2015

(87) PCT Pub. No.: WO2014/103004  
PCT Pub. Date: Jul. 3, 2014

(65) Prior Publication Data  
US 2015/0354628 A1    Dec. 10, 2015

(51) Int. Cl.  
*F16C 17/03* (2006.01)  
*F16N 1/00* (2006.01)  
(Continued)

(52) U.S. Cl.  
CPC ............... *F16C 32/064* (2013.01); *F16C 17/03* (2013.01); *F16C 17/10* (2013.01); *F16C 17/107* (2013.01); *F16C 33/106* (2013.01)

(58) Field of Classification Search  
CPC ........ F16C 17/03; F16C 17/10; F16C 17/107; F16C 17/108; F16C 32/0696; F16C 33/26; F16C 35/10; F16C 33/108  
USPC .......... 384/107, 111, 117, 302, 309, 311, 368  
See application file for complete search history.

(56) References Cited

U.S. PATENT DOCUMENTS 3,687,510 A * 8/1972 Cooper ................... F16C 17/03  
384/311  
5,271,676 A * 12/1993 Keck ..................... F01D 25/168  
384/111

(Continued)

FOREIGN PATENT DOCUMENTS

JP       48-9523 B1    3/1973  
JP       52-85054 U    6/1977

(Continued)

OTHER PUBLICATIONS

International Search Report (PCT/ISA/210) dated Feb. 12, 2013 with English-language translation (five (5) pages).

(Continued)

*Primary Examiner* — Phillip A Johnson  
(74) *Attorney, Agent, or Firm* — Crowell & Moring LLP

(57) ABSTRACT

There are provided a duplex bearing device that can reduce the temperature of lubricating oil supplied from a journal bearing to a thrust bearing and thereby can reduce the total amount of oil supplied, and a rotating machine equipped with this. A duplex bearing device 1 is equipped with a tilting pad journal bearing 2 that accepts a radial load of a rotating shaft 4, and a thrust bearing 3 that is provided on an axial end of the journal bearing 2 and accepts an axial load of the rotating shaft 4 via a thrust collar 10 provided on the outer peripheral side of the rotating shaft 4, and has a journal bearing oil supply path 17 that supplies the lubricating oil from the outside into between journal pads 5 of the journal bearing 1, a thrust bearing oil supply path 20 that supplies the lubricating oil from the outside to the thrust bearing 3, and a re-used oil supply path 23 that supplies the lubricating oil to the thrust bearing 3 only from between the journal pads 5 of the journal bearing 2.

5 Claims, 6 Drawing Sheets

(51) Int. Cl.
*F16C 32/06* (2006.01)
*F16C 17/10* (2006.01)
*F16C 33/10* (2006.01)

(56) References Cited

U.S. PATENT DOCUMENTS

| | | | | |
|---|---|---|---|---|
| 5,518,321 | A * | 5/1996 | Hata | F16C 33/108 384/311 |
| 6,471,404 | B1 * | 10/2002 | Gozdawa | F16C 32/0688 384/100 |
| 2010/0111681 | A1 | 5/2010 | Nakano et al. | |
| 2012/0141056 | A1 * | 6/2012 | Nicholas | F16C 27/02 384/125 |

FOREIGN PATENT DOCUMENTS

| | | |
|---|---|---|
| JP | 58-30024 U | 2/1983 |
| JP | 63-76913 A | 4/1988 |
| JP | 9-229069 A | 9/1997 |
| WO | WO 2008/020483 A1 | 2/2008 |

OTHER PUBLICATIONS

International Preliminary Report on Patentability (PCT/IB/338 & PCT/IB/373), including Written Opinion (PCT/ISA/237) dated Jul. 9, 2015 (six (6) pages).

* cited by examiner

DUPLEX BEARING DEVICE

TECHNICAL FIELD

The present invention relates to a duplex bearing device equipped with a tilting pad journal bearing and a thrust bearing, and a rotating machine equipped with this.

BACKGROUND ART

A steam turbine used in a thermal power plant and so forth is coupled to a generator via a rotating shaft. This rotating shaft is installed so as to extend in a horizontal direction and a plurality of journal bearings that accept a radial load including the empty weight thereof are provided. In addition, in the steam turbine, fluid force fluctuates depending on a loaded state and a rotational speed of the rotating shaft, and an axial load of the rotating shaft is also generated by this fluid force. Therefore, a thrust bearing that accepts this axial load of the rotating shaft and suppresses an axial displacement of the rotating shaft is provided.

Although in some cases the above-mentioned journal bearing and thrust bearing are separately installed, in other cases they are integrally configured as a duplex bearing device for reasons of a reduction in installation area and so forth (for example, see Patent Literature 1). The duplex bearing device described in Patent Literature 1 is equipped with the tilting pad journal bearing and the thrust bearings that have been provided on the axial both sides of this journal bearing. Lubricating oil is made to be supplied to the journal bearing through an inlet nozzle and to be further supplied from the journal bearing to the thrust bearings through an annular flow path formed on the outer peripheral side of the rotating shaft.

CITATION LIST

Patent Literature

Patent Literature 1: Japanese Patent Application Laid-Open No. Sho 63-76913

SUMMARY OF INVENTION

Technical Problem

Part of the lubricating oil that has been supplied to the tilting pad journal bearing flows into between the rotating shaft and a journal pad with rotation of the rotating shaft and forms an oil film. At this time, the temperature of the lubricating oil is increased by shearing force. Therefore, although the temperature of the lubricating oil is comparatively low on the upstream side of the journal pad in a rotational direction of the rotating shaft, the temperature of the lubricating oil becomes comparatively high on the downstream side of the journal pad in the rotational direction of the rotating shaft. That is, a circumferential temperature distribution arises in the lubricating oil in the journal bearing.

Here, in the prior art of the above-mentioned Patent Literature 1, it is made to supply the lubricating oil from the journal bearing to the thrust bearings via the annular flow path formed on the outer peripheral side of the rotating shaft. Therefore, not only the comparatively low-temperature lubricating oil but also the comparatively high-temperature lubricating oil is supplied from the journal bearing to the thrust bearings. Accordingly, there was room for improvement in terms of the temperature of the lubricating oil to be supplied from the journal bearing to the thrust bearings and eventually in terms of the total amount of oil supplied.

An object of the present invention is to provide a duplex bearing device that can reduce the temperature of lubricating oil to be supplied from a journal bearing to a thrust bearing and thereby can reduce the total amount of oil supplied, and a rotating machine equipped with this.

Solution to Problem

In order to attain the above-mentioned object, the present invention is a duplex bearing device that is equipped with a tilting pad journal bearing that accepts a radial load of a rotating shaft and a thrust bearing that is provided on an axial end of the aforementioned journal bearing and accepts an axial load of the aforementioned rotating shaft via a thrust collar provided on the outer peripheral side of the aforementioned rotating shaft, and has a journal bearing oil supply path that supplies the lubricating oil from the outside into between journal pads of the aforementioned journal bearing, a thrust bearing oil supply path that supplies the lubricating oil from the outside to the aforementioned thrust bearing, and a re-used oil supply path that supplies the lubricating oil to the aforementioned thrust bearing only from between the aforementioned journal pads of the aforementioned journal bearing.

Like this, in the present invention, the re-used oil supply path supplies the lubricating oil only from between the journal pads of the journal bearing to the thrust bearing. That is, the re-used oil supply path supplies only the comparatively low-temperature lubricating oil from the journal bearing to the thrust bearing. Accordingly, the temperature of the lubricating oil to be supplied from the journal bearing to the thrust bearing can be reduced and thereby the total amount of oil supplied can be reduced.

Advantageous Effects of Invention

According to the present invention, the temperature of the lubricating oil to be supplied from the journal bearing to the thrust bearing can be reduced and thereby the total amount of oil supplied can be reduced.

DESCRIPTION OF EMBODIMENTS

Figure 1:
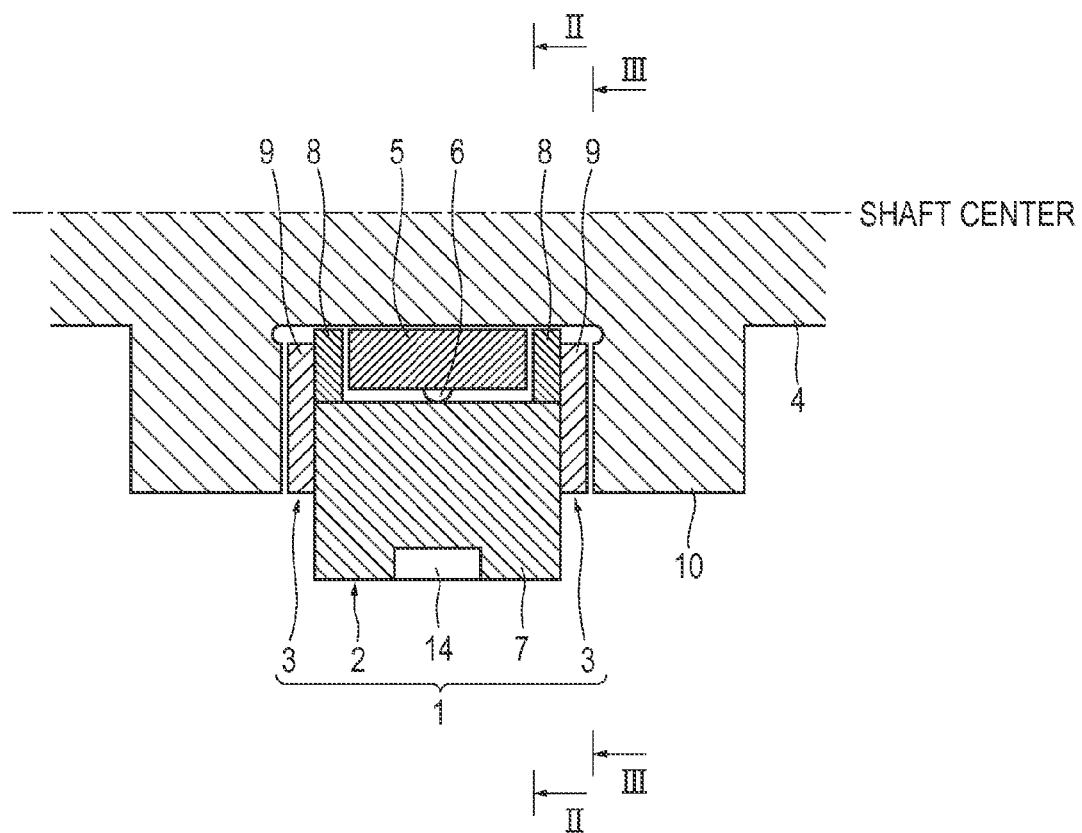
FIG. 1 is a sectional diagram showing a structure of a duplex bearing device in an embodiment of the present invention, corresponding to a section I-I in FIG. 4.

In the following, an embodiment of the present invention will be described while referring to the drawings.

Figure 2:
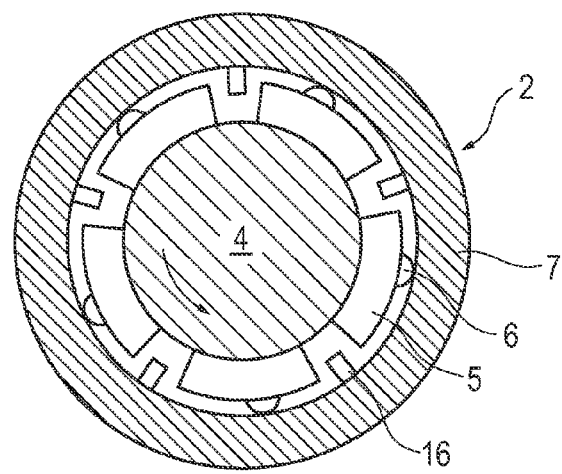
FIG. 2 is a sectional diagram by a section II-II in FIG. 1, showing a structure of a journal bearing.
Figure 3:
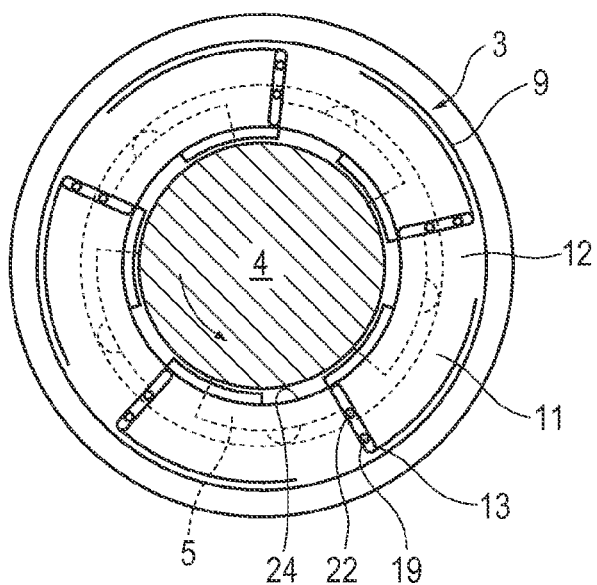
FIG. 3 is a sectional diagram by a section III-III in FIG. 1, showing a structure of a thrust bearing.
Figure 4:
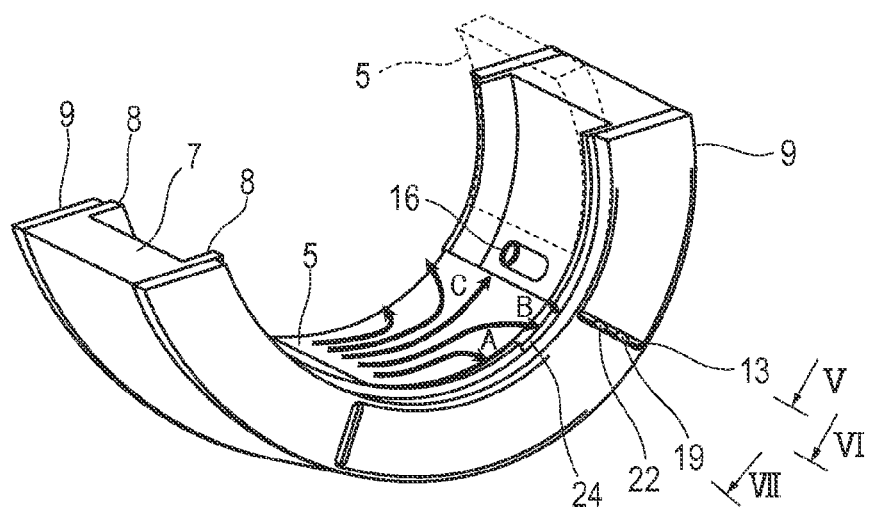
FIG. 4 is a perspective view showing a structure of a lower half of the duplex bearing device in the embodiment of the present invention.

FIG. 1 is a sectional diagram showing a structure of a duplex bearing device in the present embodiment, corresponding to a section I-I in FIG. 4. FIG. 2 is a sectional diagram by a section II-II in FIG. 1, showing a structure of a journal bearing (however, for convenience, a later described communication hole for thrust bearing is not shown). FIG. 3 is a sectional diagram by a section III-III in FIG. 1, showing a structure of a thrust bearing.

In these FIG. 1 to FIG. 3, a duplex bearing device 1 is equipped with a tilting pad journal bearing 2, and tapered-land thrust bearings 3 respectively provided on an axial one-side (a right side in FIG. 1) end and an axial other-side (a left side in FIG. 1) end of this journal bearing 2.

The journal bearing 2 is equipped with a plurality (five in the present embodiment) of journal pads 5 arranged on the outer peripheral side of a rotating shaft 4, a cylindrical housing 7 that is arranged on the outer peripheral side of these journal pads 5 and supports the journal pads 5 to be tiltable via pivots 6, and seal rings 8 that are provided on this housing 7 and cover axial one-side side faces and other-side side faces of the journal pads 5. Incidentally, in the present embodiment, it is supposed that the rotating shaft 4 is installed so as to extend in a horizontal direction.

Then, it is made such that lubricating oil from the outside is supplied into each space between the journal pads 5 in the journal bearing 2 (the details will be described later). Part of the lubricating oil that has been supplied into the space between the journal pads 5 flows into space between an outer peripheral surface of the rotating shaft 4 and an inner peripheral surface (a sliding surface) of the journal pad 5 with rotation of the rotating shaft 4 and forms an oil film. The journal pad 5 is made so as to accept a radial load of the rotating shaft 4 via this oil film. In addition, the journal pads 5 and the rotating shaft 4 are made so as to be cooled with the lubricating oil.

The thrust bearing 3 is configured by an almost annular thrust pad 9 that has been fixed to side faces of the housing 7 and the seal ring 8. A thrust collar 10 is provided on the outer peripheral side of the rotating shaft 4 and is made such that the rotating shaft 4 and the thrust collar 10 integrally rotate. The thrust pad 9 is arranged so as to face this thrust collar 10. Tapered parts 11 and land parts 12 are alternately formed along a circumferential direction on facing surface (sliding surfaces) of the thrust pad 9. The tapered part 11 is an inclined plane that becomes higher along a rotational direction (counterclockwise in FIG. 3) of the rotating shaft 4. The land part 12 is a flat plane that has been formed contiguously with the tapered part 11 at its highest position. An oil groove 13 is formed at the lowest position of each tapered part 11.

Then, it is made such that the lubricating oil from the outside and the lubricating oil from the journal bearing 2 are supplied into each oil groove 13 in the thrust pad 9 (the details will be described later). The lubricating oil that has been supplied into the oil groove 13 in the thrust pad 9 flows from the tapered part 11 to the land part 12 with rotation of the thrust collar 10. At this time, since on the tapered part 11 of the thrust pad 9, a gap between it and the thrust collar 10 is gradually narrowed, a dynamic pressure is generated by wedge effect. Then, on the land part 12 of the thrust pad 9, a high-pressure oil film is formed between it and the thrust collar 10. The thrust pad 9 is made so as to accept an axial load from the thrust collar 10 (in other words, the rotating shaft 4) via this oil film. In addition, the thrust pad 9 and the thrust collar 10 are made so as to be cooled with the lubricating oil.

Figure 5:
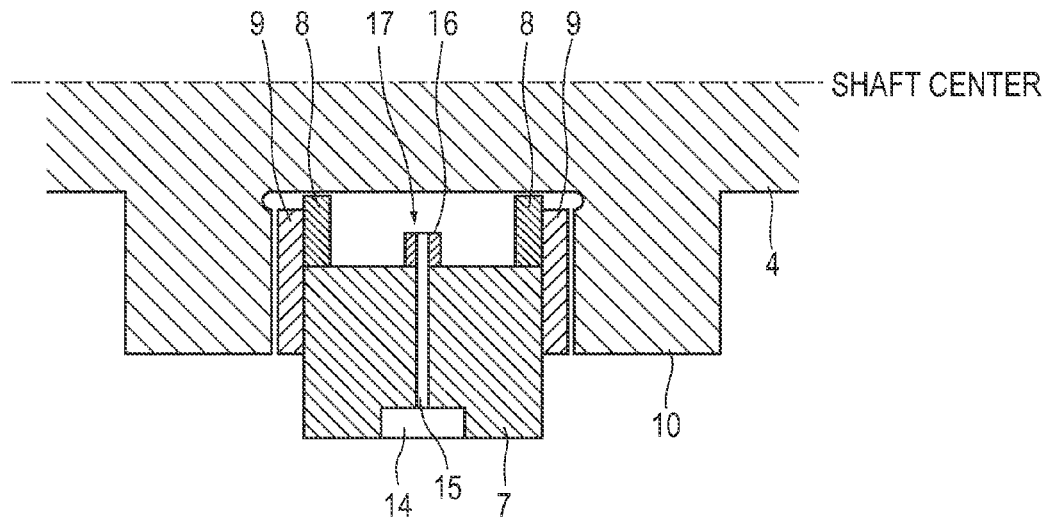
FIG. 5 is a sectional diagram by a section V-V in FIG. 4, showing a journal bearing oil supply path.
Figure 6:
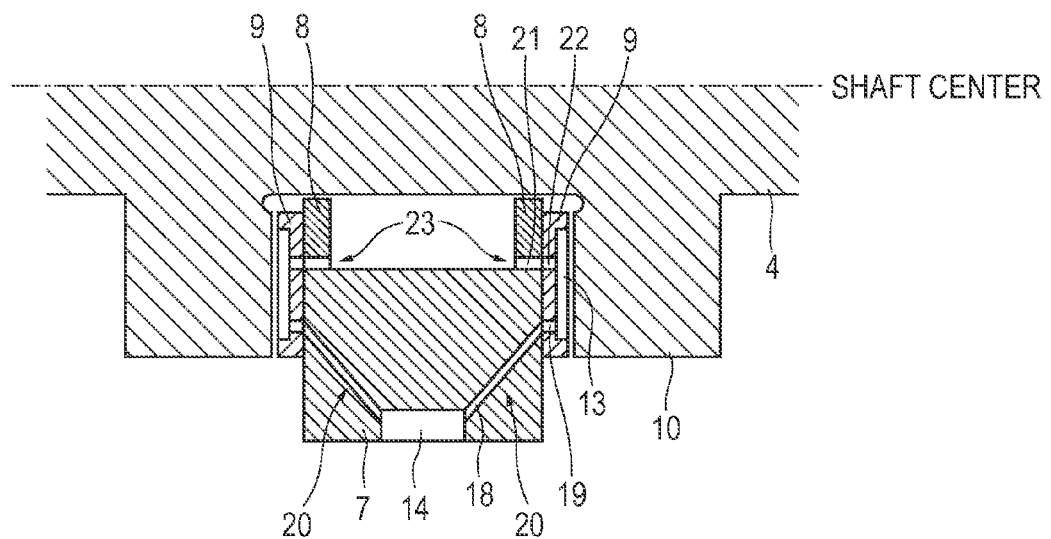
FIG. 6 is a sectional diagram by a section VI-VI in FIG. 4, showing a thrust bearing oil supply path and a re-used oil supply path.
Figure 7:
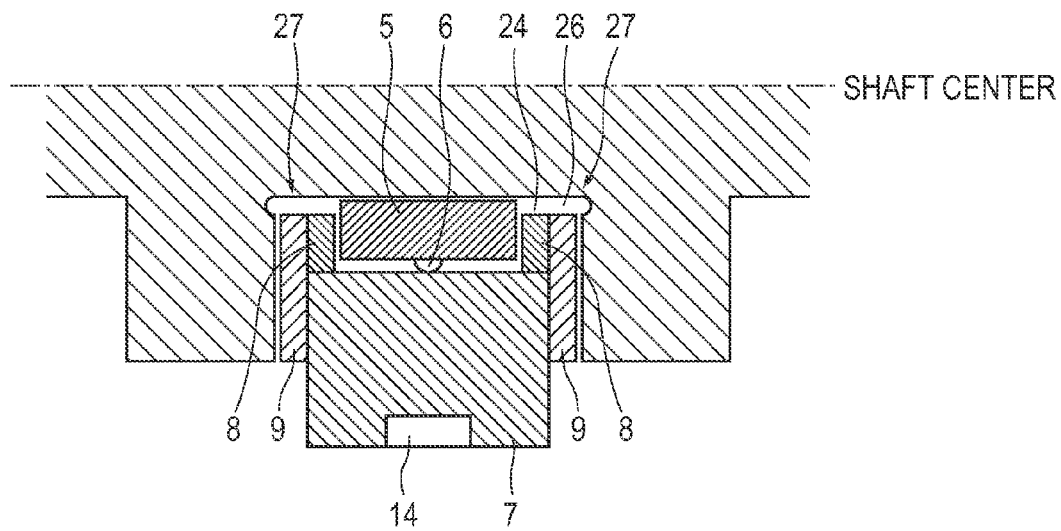
FIG. 7 is a sectional diagram by a section VII-VII in FIG. 4, showing a part of an oil discharge path.
Figure 8:
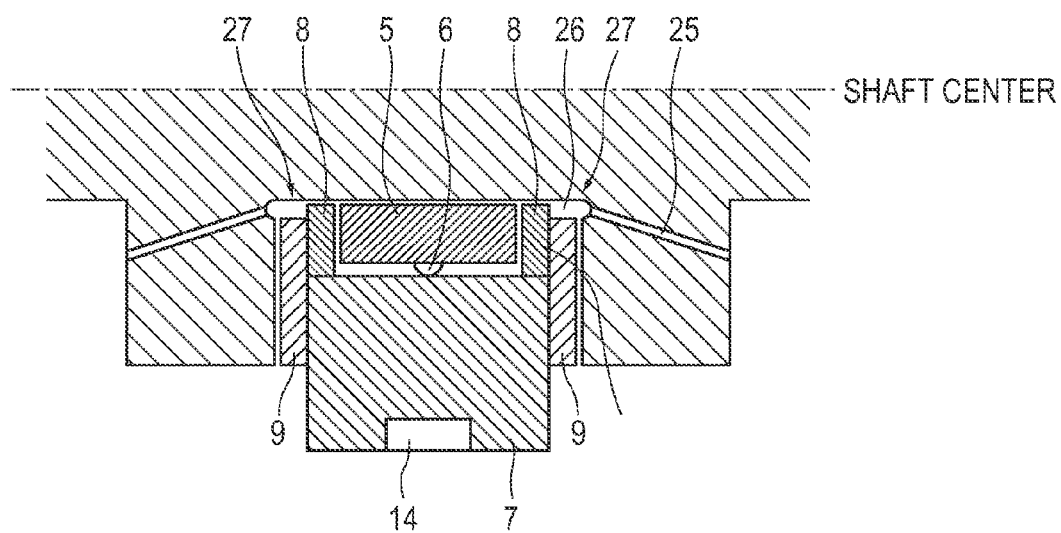
FIG. 8 is a sectional diagram by a section VIII-VIII in FIG. 4, showing a part of the oil discharge path.

Next, an oil supply path and an oil discharge path of the duplex bearing device 1 will be described by using FIG. 4 to FIG. 8. FIG. 4 is a perspective view showing a structure of a lower half of the duplex bearing device 1. FIG. 5 is a sectional diagram by a section V-V in FIG. 4, showing a structure of a journal bearing oil supply path. FIG. 6 is a sectional diagram by a section VI-VI in FIG. 4, showing structures of a thrust bearing oil supply path and a re-used oil supply path. FIG. 7 is a sectional diagram by a section VII-VII in FIG. 4, showing a part of the oil discharge path. FIG. 8 is a sectional diagram by a section VIII-VIII in FIG. 4, showing a part of the oil discharge path.

In these FIG. 4 to FIG. 8 and the above-mentioned FIGS. 1 to 3, an oil supply groove 14 that extends in a circumferential direction is formed in an outer peripheral surface of the housing 7 and it is made such that the lubricating oil is supplied from the outside into the oil supply groove 14.

In the housing 7, a plurality (five in the present embodiment) of journal bearing oil supply holes 15 that extend from the oil supply groove 14 toward spaces between the journal pads 5 are formed. A plurality (five in the present embodiment) of oil supply nozzles 16 are respectively connected to these journal bearing oil supply holes 15. The oil supply holes 15 and the oil supply nozzles 16 configure a journal bearing oil supply path 17 and are made so as to supply the lubricating oil that has been supplied from the outside into the oil supply groove 14 into the spaces between the pads 5 of the journal bearing 2.

In the housing 7, a plurality (five in the present embodiment) of thrust bearing oil supply holes 18 that extend from the oil supply groove 14 toward the oil grooves 13 in the thrust pad 9 are formed. In addition, in the thrust pad 9, a plurality (five in the present embodiment) of first communication holes 19 that each communicate with the oil groove 13 and the thrust bearing oil supply hole 18 are formed. The oil supply holes 18 and the communication holes 19 configure a thrust bearing oil supply path 20 and are made so as to supply the lubricating oil that has been supplied from the outside into the oil supply groove 14 to the thrust bearing 3 (describing in detail, the oil grooves 13 in the thrust pad 9).

In the seal ring 8, a plurality (five in the present embodiment) of re-used oil supply holes 21 that each communicate the space between the journal pads 5 are formed. The reused oil supply hole 21 is located in the vicinity of an inner peripheral surface of the housing 7. In addition, in the thrust pad 9, a plurality (five in the present embodiment) of second communication holes 22 that each communicate with the oil groove 13 and the re-used oil supply hole 21 are formed. The oil supply holes 21 and the communication holes 22 configure a re-used oil supply path 23 and are made so as to supply the lubricating oil only from the spaces between the pads 5 of the journal bearing 2 to the thrust bearing 3 (describing in detail, the oil grooves 13 in the thrust pad 9).

In the seal ring 8, a plurality (five in the present embodiment) of notched grooves 24 are formed each corresponding to a downstream side region of the sliding surface of the journal pad 5 in the rotational direction of the rotating shaft 4 (describing in detail, the region ranging from a central part to a downstream side end in the rotational direction). Incidentally, a gap between a part of the seal ring 8 other than the notched grooves 24 and the rotating shaft 4 is narrower than a minimum gap between the journal pad 5 and the rotating shaft 4. The notched groove 24 of the seal ring 8 is widened to about several times the minimum gap between the journal pad 5 and the rotating shaft 4. In addition, in the thrust collar 10, a plurality (five in the present embodiment, however it may be more than that) of through holes 25 that axially pass through it are formed. In addition, an annular space 26 formed between the thrust pad 9 and the rotating shaft 4 is made so as to communicate with the notched grooves 24 and the through holes 25. The notched grooves 24, the through holes 25, and the space 26 configure an oil discharge path 27 and are made so as to discharge the lubricating oil from the journal bearing 2 (describing in detail, the downstream side region of the sliding surface of every journal pad 5 in the rotational direction of the rotating shaft 4) to the outside (particularly, see an arrow B in FIG. 4). Incidentally, the through hole 25 is formed such that an outlet on the opposite side is located on the more radially outer side (the lower side in FIG. 8) of the thrust collar 10 than an inlet on the journal bearing 2 side. Thereby, centrifugal force acts with rotation of the thrust collar 10 to make it easier to discharge the lubricating oil.

Next, operational effects of the present embodiment will be described.

Figure 9:
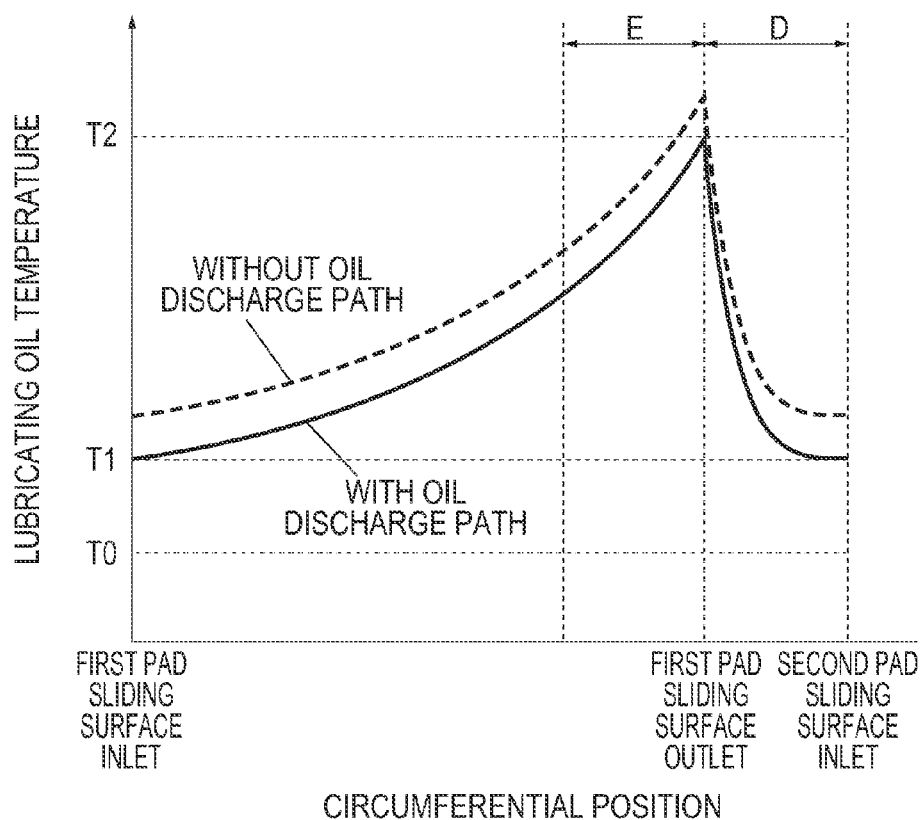
FIG. 9 is a diagram showing a circumferential temperature distribution of lubricating oil in the journal bearing in the embodiment of the present invention.

FIG. 9 is a diagram showing a circumferential temperature distribution of the lubricating oil in the journal bearing 2 in the present embodiment. The horizontal axis in this FIG. 9 indicates the circumferential position on the sliding surface of the journal pad 5 and on its extension and the vertical axis indicates the temperature of the lubricating oil.

As shown by arrows A and B in the above-mentioned FIG. 4, part of the lubricating oil that has flown into an inlet of the sliding surface of the first journal pad 5 (in other words, an upstream side end of the sliding surface of the first journal pad 5 in the rotational direction of the rotating shaft 4) flows in an axial direction under the influence of an oil film pressure. As shown by an arrow C in the above-mentioned FIG. 4, the remaining lubricating oil flows in the circumferential direction, flows out through an outlet of the sliding surface of the first journal pad 5 (in other words, a downstream side end of the sliding surface of the first journal pad 5 in the rotational direction of the rotating shaft 4), and flows out into between the first journal pad 5 and the second journal pad 5 that is adjacent to this. At this time, in the present embodiment, as shown in FIG. 9, the lubricating oil reaches a temperature T1 at the inlet of the sliding surface of the first journal pad 5 and rises up to a temperature T2 at the outlet of the sliding surface of the first journal pad 5. Then, the lubricating oil of the temperature T2 that has flown out through the outlet of the sliding surface of the first journal pad 5 and the lubricating oil of a temperature T0 that has been supplied through the oil supply nozzle 16 are mixed together in the space between the first journal pad 5 and the second journal pad 5. Thereby, the lubricating oil that is present at the inlet of the sliding surface of the second journal pad 5 reaches T1.

Here, in the present embodiment, the re-used oil supply path 23 is provided and this re-used oil supply path 23 supplies the lubricating oil only from between the journal pads 5 (a region D in FIG. 9) of the journal bearing 2 to the thrust bearing 3. That is, the re-used oil supply path 23 supplies only the comparatively low-temperature lubricating oil from the journal bearing 2 to the thrust bearing 3. In particular, since the supply hole 21 in the re-used oil supply path 23 is located in the vicinity of the inner peripheral surface of the housing 7 and is separated from the sliding surface of the journal pad 5, the temperature of the lubricating oil supplied from the journal bearing 2 to the thrust bearing 3 is made lower than that shown in FIG. 9 (approximating to the temperature T0). Accordingly, the temperature of the lubricating oil supplied from the journal bearing 2 to the thrust bearing 3 can be reduced.

In addition, in the present embodiment, the oil discharge path 27 is provided and this oil discharge path 27 discharges the lubricating oil from a downstream side region of the sliding surface of every journal pad 5 in the rotational direction of the rotating shaft 4 (a region E in FIG. 9) to the outside. Thereby, the temperature of the lubricating oil in the journal bearing 2, particularly, the temperature of the lubricating oil between the journal pads 5 can be reduced in comparison with a case where the oil discharge path 27 is not provided as shown by a dotted line in FIG. 9. Accordingly, the temperature of the lubricating oil supplied from the journal bearing 2 to the thrust bearing 3 can be more reduced.

Then, by reducing the temperature of the lubricating oil supplied from the journal bearing 2 to the thrust bearing 3, cooling action of that lubricating oil can be increased. Accordingly, the amount of oil supplied from the outside to the thrust bearing 3 through the thrust bearing oil supply path 20 can be reduced and the total amount of oil supplied of the duplex bearing device 1 can be reduced. Description will be specifically made by using FIG. 10.

Figure 10:
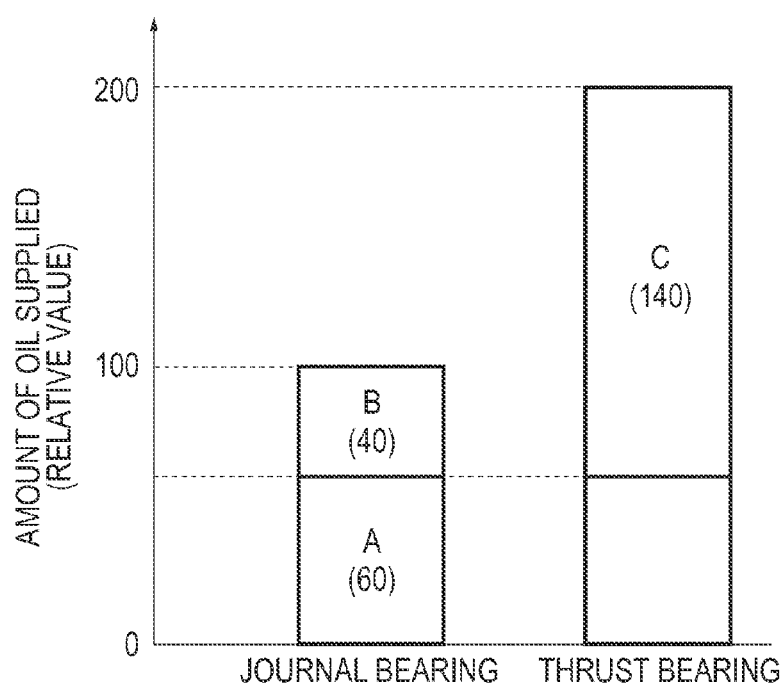
FIG. 10 is a diagram showing a specific example of an amount of oil supplied of the duplex bearing device in the embodiment of the present invention.

FIG. 10 is a diagram showing a specific example of the amount of oil supplied of the duplex bearing device 1 in the present embodiment. In this FIG. 10, the amount of oil required for the journal bearing 2 is set to 100 and the amount of oil required for the thrust bearing 3 is relatively shown. That is, the amount of oil required for the thrust bearing 3 is two times the amount of oil for the journal bearing 2 and amounts to 200.

In the present embodiment, as described above, by reducing the temperature of the lubricating oil supplied from the journal bearing 2 to the thrust bearing 3, the cooling action thereof can be increased. Thereby, part corresponding to 60 in the amount of oil supplied 100 of the lubricating oil that has been supplied to the journal bearing 2 can be re-used by supplying it from the journal bearing 2 to the thrust bearing 3. That is, 60 in the amount of oil 200 for the thrust bearing 3 can be compensated and the amount of oil supplied from the outside to the thrust bearing 3 is reduced to 140. Therefore, the total amount of oil supplied of the duplex bearing device 1 amounts to 100+140=240.

Figure 11:
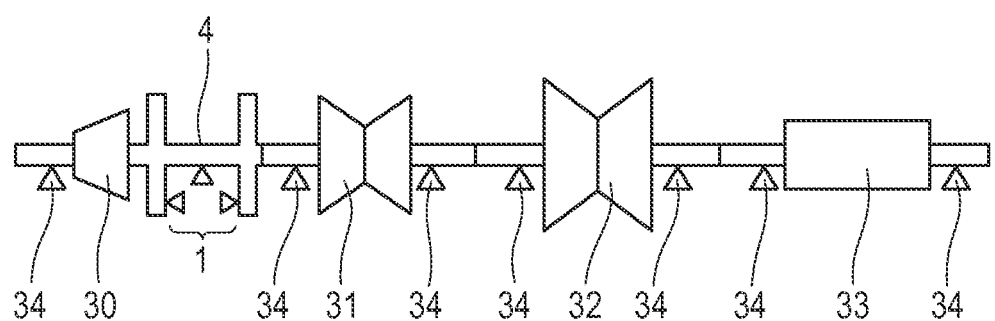
FIG. 11 is a diagram showing a steam turbine equipped with the duplex bearing device according to the embodiment of the present invention.

Next, one example of a rotating machine equipped with the duplex bearing device 1 of the present embodiment will be described by using FIG. 11. FIG. 11 is a diagram showing a configuration of a steam turbine equipped with the bearing device of the present embodiment.

In this FIG. 11, the steam turbine is configured by a high pressure turbine 30, an intermediate pressure turbine 31, and a low pressure turbine 32 respectively corresponding to steam pressures, and these turbines 30, 31, 32 and a generator 33 are coupled together via the rotating shaft 4. Then, a plurality of journal bearing devices 34 for accepting the radial load of the rotating shaft 4, and the duplex bearing device 1 for accepting the radial load and the axial load of the rotating shaft 4 are provided.

In such a steam turbine, auxiliary machines and accessories (describing in detail, pumps, piping and so forth) for oil supply can be miniaturized owing to a reduction in amount of oil supplied to the duplex bearing device 1. Thus, miniaturization of the steam turbine can be promoted.

Incidentally, although in the duplex bearing device 1 of the above-mentioned embodiment, description has been made by giving a case where the through hole 25 has been formed such that the outlet is located on the more radially outer side of the thrust collar 10 than the inlet by way of example, it is not limited thereto and it may be formed to be parallel therewith in the axial direction.

In addition, although in the duplex bearing device 1 of the above-mentioned embodiment, description has been made by giving a case where the oil supply groove 14 has been formed in the housing 7 by way of example, it is not limited thereto and can be modified within a range not deviating from the technical idea and the gist of the present invention. That is, for example, a casing (not shown) may be provided on the outer peripheral side of the housing 7 of the duplex bearing device 1, the oil supply groove may be formed in this casing, and the oil supply groove 14 may not be formed in the housing 7. In this case, it is enough if the journal bearing oil supply holes 15 and the thrust bearing oil supply holes 18 in the housing 7 communicate with the oil supply groove in the casing.

In addition, although in the duplex bearing device 1 of the above-mentioned embodiment, description has been made by giving a case where the five re-used oil supply holes 21 that respectively communicate with the five spaces among the journal pads 5 have been formed in the seal ring 8 by way of example, it is not limited thereto and can be modified within a range not deviating from the technical idea and the gist of the present invention. That is, for example, only the two re-used oil supply holes 21 that respectively communicate with two lower side spaces between the journal pads 5 may be formed, considering that the lubricating oil is more liable to stay in the lower side space between the journal pads 5 than in the upper side space between the journal pads 5. In addition, for example, the thrust bearing oil supply path 20 may be configured such that the amount of oil supplied to the lower side oil groove 13 is more reduced than the amount of oil supplied to the upper side oil groove 13 by changing radial dimensions of the thrust bearing oil supply hole 18 or the first communication hole 19 and so forth.

In addition, although in the duplex bearing device 1 of the above-mentioned embodiment, description has been made by giving a case where the oil groove 13 with which both of the first communication hole 19 and the second communication hole 22 communicate has been formed by way of example, it is not limited thereto and can be modified within a range not deviating from the technical idea and the gist of the present invention. That is, for example, the oil groove 13 may be divided into two and configured such that the first communication hole 19 communicates with one and the second communication hole 22 communicates with the other, considering that backward flowing of the lubricating oil supplied from the first communication hole 19 through the second communication hole 22 is to be suppressed.

In addition, although in the duplex bearing device 1 of the above-mentioned embodiment, description has been made by giving a case where the thrust bearings 3 have been provided on the axial both sides of the journal bearing 2 byway of example, it is not limited thereto and the thrust bearing 3 may be provided only on the axial one side of the journal bearing 2. In addition, although in the duplex bearing device 1 of the above-mentioned embodiment, description has been made by giving a case where the tapered land thrust bearing 3 has been provided by way of example, it is not limited thereto and the tilting pad thrust bearing may be provided in place of this. Also in these cases, the same advantageous effects as the above can be obtained.

REFERENCE SIGNS LIST 1 duplex bearing device
2 journal bearing
3 thrust bearing
4 rotating shaft
5 journal pad
6 pivot
7 housing
8 seal ring
9 thrust pad
10 thrust collar
11 tapered part
12 land part
13 oil groove
14 oil supply groove
15 journal bearing oil supply hole
16 oil supply nozzle
17 journal bearing oil supply path
18 thrust bearing oil supply hole
19 first communication hole
20 thrust bearing oil supply path
21 re-used oil supply hole
22 second communication hole
23 re-used oil supply path
24 notched groove
25 through hole
26 space
27 oil discharge path

The invention claimed is:

1. A duplex bearing device, comprising:
   a tilting pad journal bearing that accepts a radial load of a rotating shaft; and
   a thrust bearing that is provided on an axial end of the journal bearing and accepts an axial load of the rotating shaft via a thrust collar provided on the outer peripheral side of the rotating shaft,
   the duplex bearing device including:
   a journal bearing oil supply path that supplies lubricating oil from the outside into between journal pads of the journal bearing;
   a thrust bearing oil supply path that supplies the lubricating oil from the outside to the thrust bearing; and
   a re-used oil supply path that supplies the lubricating oil to the thrust bearing only from between the journal pads of the journal bearing,
   the re-used oil supply path is configured by a re-used oil supply hole that is formed in a seal ring that covers axial side faces of the journal pads of the journal bearing and communicates between the journal pads, and a communication hole that is formed in a thrust pad of the thrust bearing and communicates with the re-used oil supply hole and an oil groove that has been formed in a sliding surface of the thrust pad.

2. The duplex bearing device according to claim 1, comprising:
   an oil discharge path that discharges the lubricating oil from the journal bearing to the outside,
   wherein the oil discharge path discharges the lubricating oil to the outside from a downstream side region of a sliding surface of the journal pad in a rotational direction of the rotating shaft.

3. The duplex bearing device according to claim 2,
   wherein the journal bearing oil supply path is configured by a journal bearing oil supply hole that has been formed in a housing of the journal bearing, and an oil supply nozzle that is connected to the journal bearing oil supply hole and supplies the lubricating oil into between the journal pads,
   the thrust bearing oil supply path is configured by a thrust bearing oil supply hole that has been formed in the housing of the journal bearing, and a communication hole that is formed in the thrust pad and communicates with the oil groove and the thrust bearing oil supply hole, the oil discharge path has been configured by a notched groove that has been formed in the seal ring of the journal bearing so as to correspond to the downstream side region of the sliding surface of the journal pad in the rotational direction of the rotating shaft, a through hole that has been formed in the thrust collar so as to axially pass through, and a space that is formed between the thrust pad of the thrust bearing and the rotating shaft and communicates with the notched groove and the through hole.

4. The duplex bearing device according to claim 3, wherein the through hole has been formed such that an outlet is located on the more radially outer side of the thrust collar than an inlet.

5. A rotating machine, comprising the duplex bearing device according to claim 1.

* * * * *